US008280594B2

(12) United States Patent
Hara et al.

(10) Patent No.: US 8,280,594 B2

(45) Date of Patent: Oct. 2, 2012

(54) DOOR OPENING/CLOSING APPARATUS AND COATING FILM FORMING METHOD

(75) Inventors: Takashi Hara, Obu (JP); Masahiro Hagimoto, Anjo (JP); Takehiro Tabata, Kariya (JP); Masaki Kato, Kariya (JP); Kazuki Mizutani, Miyoshi (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 13/394,014

(22) PCT Filed: Sep. 10, 2010

(86) PCT No.: PCT/JP2010/065619

§ 371 (c)(1), (2), (4) Date: Mar. 2, 2012

(87) PCT Pub. No.: WO2011/037028

PCT Pub. Date: Mar. 31, 2011

(65) Prior Publication Data

US 2012/0166023 A1 Jun. 28, 2012

(30) Foreign Application Priority Data

Sep. 28, 2009 (JP) ................................ 2009-222387

(51) Int. Cl.
*G06F 19/00* (2006.01)

(52) U.S. Cl. .............................. 701/49; 701/2; 427/250

(58) Field of Classification Search ................ 701/2, 36, 701/45, 49; 427/250–255.13, 256–261; 180/272, 180/273

See application file for complete search history.

(56) References Cited

U.S. PATENT DOCUMENTS 7,548,210 B2 6/2009 Hashiguchi et al.
7,696,859 B2 * 4/2010 Teshima et al. .............. 340/5.72
8,032,285 B2 * 10/2011 Li .................................. 701/49

(Continued)

FOREIGN PATENT DOCUMENTS

JP 2005-113475 A 4/2005

(Continued)

OTHER PUBLICATIONS

International Search Report (PCT/ISA/210) issued on Dec. 7, 2010, by Japanese Patent Office as the International Searching Authority for International Application No. PCT/JP2010/065619. Written Opinion (PCT/ISA/237) issued on Dec. 7, 2010, by Japanese Patent Office as the International Searching Authority for International Application No. PCT/JP2010/065619 (in Japanese).

(Continued)

*Primary Examiner* — Richard M. Camby

(74) *Attorney, Agent, or Firm* — Buchanan Ingersoll & Rooney PC

(57) ABSTRACT

A door opening/closing apparatus includes an opening/closing handle provided in a vehicle door, electrodes disposed in the door handle, a detection circuit configured to detect a change of electrostatic capacitance which occurs in the vicinity of the electrodes when a human body portion approaches or contacts the door handle and then to output a locking or unlocking operation signal and a device for executing locking or unlocking of the door based on the operation signal, and a transmission/reception antenna for effecting transmission/reception with a portable unit corresponding to the vehicle, wherein the door handle includes an insulating base body, and on a vehicle outer side surface of the base body, there is attached a metal layer comprised of a group of island shaped metal particles that extend along the surface of the base body and that are separated from each other.

10 Claims, 6 Drawing Sheets

U.S. PATENT DOCUMENTS

| | | | | |
|---|---|---|---|---|
| 8,073,598 | B2 * | 12/2011 | Shimoda | 701/49 |
| 8,190,331 | B2 * | 5/2012 | Browne et al. | 701/45 |
| 2005/0073804 | A1 | 4/2005 | Maruyama et al. | |
| 2007/0176622 | A1 | 8/2007 | Yamazaki | |

FOREIGN PATENT DOCUMENTS

| | | | |
|---|---|---|---|
| JP | 2006-285109 | A | 10/2005 |
| JP | 2007-142784 | A | 6/2007 |
| JP | 2009-222387 | A | 10/2009 |
| WO | WO 2009/019222 | A1 | 2/2009 |

OTHER PUBLICATIONS

Office Action dated Apr. 12, 2012, issued in the corresponding Japanese Patent Application No. 2011-532962. (2 pages).

Notification of Transmittal of Translation of the International Preliminary Report on Patentability (Forms PCT/IB/338 and PCT/IB/373) and the Written Opinion of the International Searching Authority (Form PCT/ISA/237) issued on Apr. 19, 2012, in the corresponding International Application No. PCT/JP2010/065619. (5 pages).

* cited by examiner

Fig.5

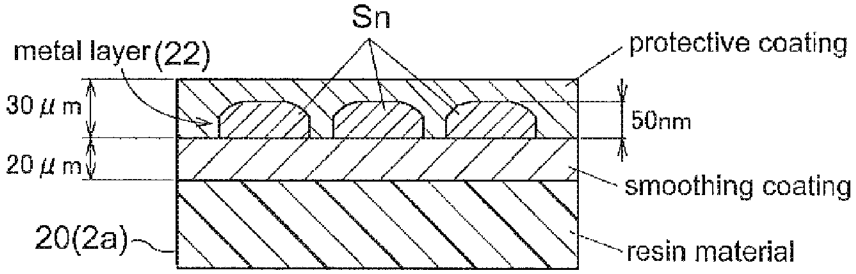

Fig.6

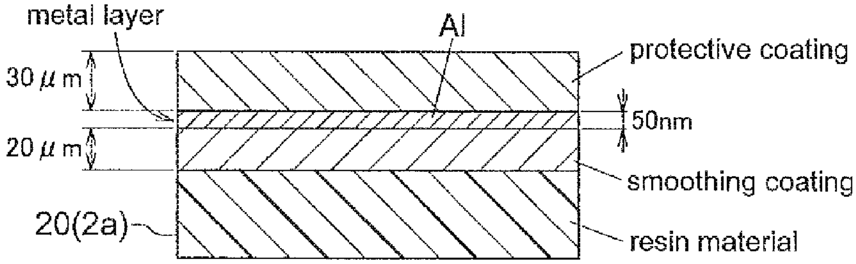

Fig.7

| coating film | metal species | film thickness | surface resistance (Ω/□) | handling performance | |
|---|---|---|---|---|---|
| | | | | antenna | sensor |
| Example1 | Sn | 50nm | $2.64 \times 10^{12}$ | no influence | no influence |
| Comparison Example 1 | Al | 10nm | 2.7 | no influence | operation error (activated when a portion other than vicinity of sensor is touched ) |
| Comparison Example 2 | Al | 50nm | 30.5 | no influence | operation error (activated when a portion other than vicinity of sensor is touched ) |

Fig.8
| coating film | metal species | SEM photo |
|---|---|---|
| Example 1 | Sn | 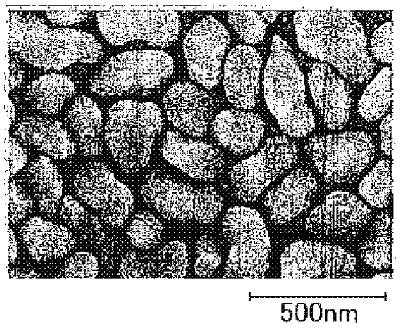<br>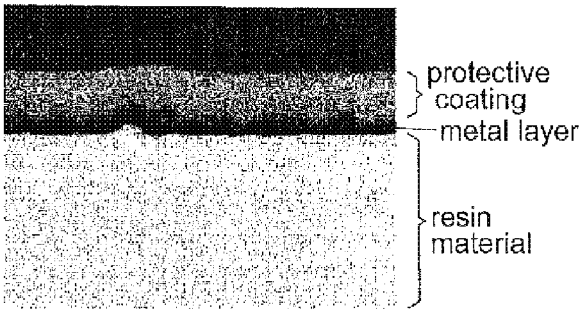 |
| Comparison Example1 | Al | 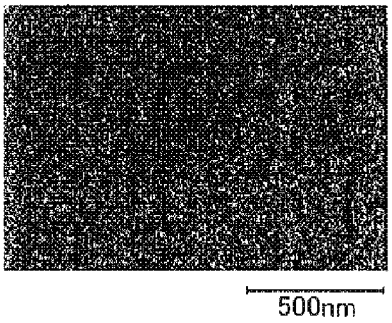 |
| Comparison Example2 | Al | 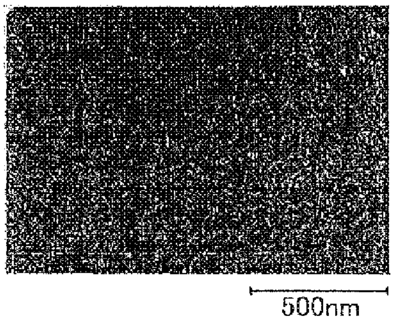 |

Fig.9
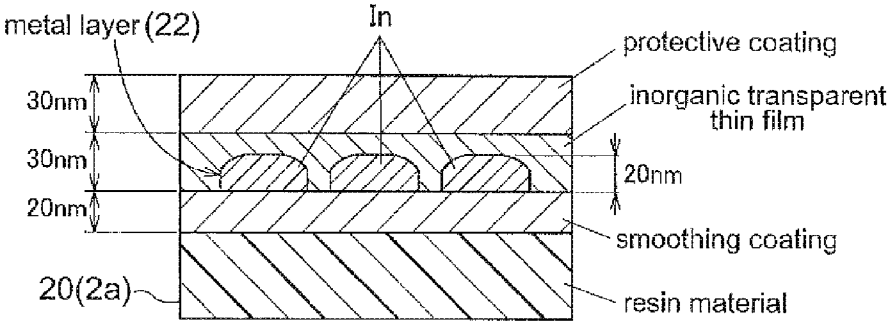
Fig.10
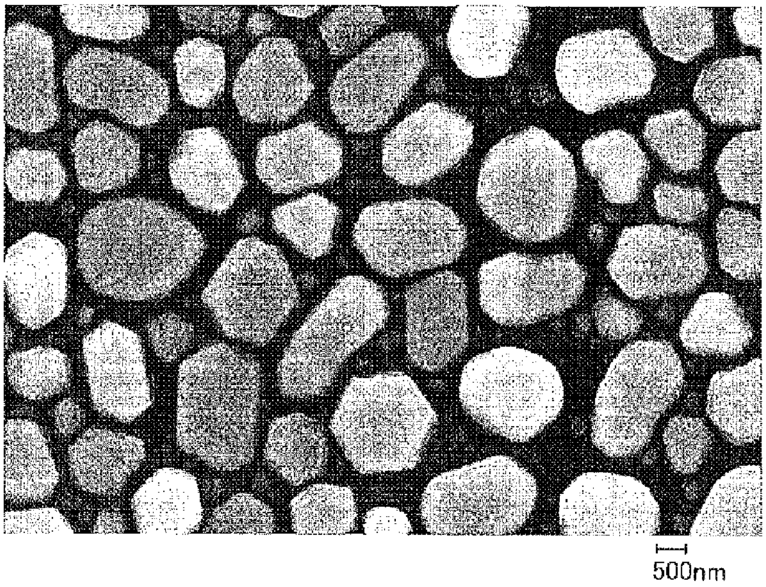
Fig.11
| film coating | transparent thin film ($SiO_2$) | color difference ($\Delta E$) | initial adherence (number peelings) |
|---|---|---|---|
| Example 2 | Yes (30nm) | 1.9 | 0/100 |
| Comparison Example3 | No | 9.7 | 0/100 |

DOOR OPENING/CLOSING APPARATUS AND COATING FILM FORMING METHOD

TECHNICAL FIELD

The present invention relates to a door opening/closing apparatus of the so-called smart-entry type, including a door opening/closing handle provided in a door of a vehicle, a sensor provided in this door handle, a detection circuit configured to detect a change in electrostatic capacitance occurring in the vicinity of the sensor in response to approaching or contacting of a human body portion relative to the door handle and to output a locking or unlocking operation signal, a device for executing locking/unlocking of the door based on the operation signal and a transmission/reception antenna for effecting transmission/reception with a portable unit corresponding to the vehicle. The invention relates also a coating film forming method for use in the above-described door opening/closing apparatus.

BACKGROUND ART

In the case of a door opening/closing apparatus disclosed in Patent Document 1 as an example of prior art document information relating to the door opening/closing apparatus of the above-noted type, as a metallic coating for providing metallic lustrous aesthetic property to a cover to be attached to a main body of the door handle, there is effected a spray coating of a coating material containing, as major components thereof, fine metal particles of aluminum or aluminum alloy and acrylic resin. In doing this, care is taken not to form discontinuous portions of the fine metallic particles wherein the particles are present in discontinuous manner. This is done by positively reducing the thickness of the coating film to from 0.1 to 40 μm. The document reports that loss in antenna output due to the metallic coating was restricted as the result of the above arrangement.

However, with the door opening/closing apparatus disclosed in Patent Document 1, it is difficult to control such that the film thickness of the coating film be uniform. Consequently, there would occur uneven distribution of the fine metal particles, thus inviting the risk that the level of change in the electrostatic capacitance due to a touch by a user's hand varies significantly depending on the position of the hand relative to the door handle. Further, in this known coating arrangement, the fine metal particles are distributed in the acrylic resin as the coating film. Hence, it is difficult to obtain good luster performance equivalent or comparable to that of a metal plating.

On the other hand, according to a further door opening/closing apparatus disclosed in Patent Document 2 which is another prior-art document, in an attempt to overcome the above-described problems present in the technique of Patent Document 1 and to ensure reduction in the antenna output loss as well as stability of communication while retaining metallic luster as substantially good as that of plating, a metal thin film is formed by the sputtering technique on the outer surface of the door handle. The metal cited as an example of a target of sputtering in Patent Document 2 is Cr.

PRIOR ART DOCUMENT

Patent Documents

Patent Document 1: Japanese Unexamined Patent Application Publication No. 2005-113475 (paragraphs 0020, 0030, FIG. 3)

Patent Document 2: Japanese Unexamined Patent Application Publication No. 2007-142784 (paragraphs 0004, 0015, FIG. 3).

SUMMARY OF THE INVENTION

Problem to be Solved by Invention

However, with the door opening/closing apparatus disclosed in Patent Document 2, while the restriction of antenna output loss was made possible, the apparatus would still tend to suffer an operation error or failure when a user brings his/her hand or the like into vicinity of or contact with the door handle for having a locking or unlocking operation executed. As an example of such operation error, there can be cited an inconvenient phenomenon that in response to approaching of the hand to an unlock sensor of the door handle for unlocking the locked door, the door is unlocked once, but then is locked again immediately thereafter.

Then, in view of the problem proposed by the door opening/closing apparatuses of the above-cited prior art, the object of the present invention is to provide a door opening/closing apparatus with a door handle having an excellent metallic luster, yet hardly suffering an operation error or an operation failure at the time of locking/unlocking operation.

Means for Solving Problems

According to the first characterizing feature of a door opening/closing apparatus relating to the present invention, the apparatus comprises:

a door opening/closing handle provided in a door of a vehicle;

a sensor provided in the door handle;

a detection circuit configured to detect a change in electrostatic capacitance occurring in the vicinity of the sensor in response to approaching or contacting of a human body portion relative to the door handle and to output a locking or unlocking operation signal;

a device for executing locking/unlocking of the door based on the operation signal; and a transmission/reception antenna for effecting transmission/reception with a portable unit corresponding to the vehicle;

wherein the door handle includes an insulating base body, and on a vehicle outer side surface of the base body, there is attached a metal layer comprised of a group of island shaped metal particles that extend along the surface of the base body and that are separated from each other.

With the door opening/closing apparatus having the first characterizing feature of the present invention, the metal layer provided in the door handle is comprised not of a single and continuous metal thin film, but of a group of island shaped metal particles separated from each other. Hence, while a distinguished mirror-face aesthetic property is retained, the surface resistance can be sufficiently high, thus restricting occurrence of capacitance coupling between the sensor and the metal layer. As a result, there is achieved the advantageous effect of change of electrostatic capacitance occurring in the vicinity of the sensor being rendered stable, which in turn restricts occurrence of an operation error or failure.

Moreover, with the door opening/closing apparatus having the first characterizing feature of the present invention, since the metal layer provided in the door handle is comprised of a group of island shaped metal particles separated from each other, even in the event of occurrence, during use, of partial corrosion due to e.g. formation of a surface flaw as deep as reaching the metal layer, the inter-particle gaps between the metal particles effectively prevent the corrosion from reaching the adjacent metal particles. This is another advantage achieved by the above arrangement.

Incidentally, the arrangement of Patent Document 2 failed to solve the problem of operation error or failure associated with the function of the sensor presumably for the following reason. Since the metal layer thereof is formed by sputtering of a thin film of a metal such as Cr which has a high melting point, the metal layer tends to be formed inevitably as a single metal layer which is continuous throughout, such that the metal layer provides only a low surface resistance (estimated value: below $1\times10^2$ Ω/square). Hence, at the time of approach or contact of e.g. a user's hand to the door handle, capacitance coupling tends to occur between the lock sensor or unlock sensor and the metal layer.

According to another characterizing feature of the present invention, the metal particle has a thickness ranging from 10 to 200 nm and a surface resistance value of at least $1\times10^6$ Ω/square.

The above arrangement ensures mirror-face like distinguished aesthetic property and achieves also further stability in the changing behavior of the electrostatic capacitance occurring in the vicinity of the sensor.

According to a still another characterizing feature of the present invention, the metal layer is formed by vacuum deposition and the metal particles are comprised of a metal element or an alloy having a lower melting point than aluminum.

With use of a metal element or an alloy having a relatively low melting point such as tin, indium or the like as proposed in the above-described arrangement, the resultant metal layer will not be formed as a generally continuous single metal layer which would be formed by the vacuum deposition with using aluminum, chrome or the like having high melting points as its evaporation source; rather, the resultant layer can be formed easily as a group of island shaped metal particles suitable for the stabilization of electrostatic capacitance in the vicinity of the sensor.

According to a still another characterizing feature of the present invention, the inter-particle gaps between the metal particles adjacent each other range from 5 to 200 nm. According to a still another characterizing feature of the present invention, the metal particles have a particle diameter ranging from 10 nm to 20 μm.

With the above-described arrangements, the metal layer as a whole obtains sufficient degree of reflection, yet has a high surface resistance value. Therefore, while the distinguished aesthetic property is retained, the capacitance coupling between the sensor and the metal layer can be restricted in a reliable manner. As a result, there is achieved the advantage of stability in the change of electrostatic capacitance in the vicinity of the sensor, thus restricting occurrence of operation error or failure.

According to a still another characterizing feature of the present invention, an inorganic transparent thin film is formed between the metal layer and a protective coating for protecting the metal layer.

If an inorganic transparent thin film is formed between the metal layer and a protective coating for protecting the metal layer as proposed by the above-described arrangement, even in the event of degradation of the protective coating due to e.g. UV exposure, development of corrosion or discoloration of the metal layer can be effectively restricted by the inorganic transparent thin film which is chemically stable.

According to the characterizing feature of a coating film forming method which also relates to the present invention, the method comprises a coating film forming step for forming a metal layer by vapor deposition on a base body formed of an insulator;

wherein the metal layer is comprised of a metal element or an alloy having a lower melting point than aluminum; and the coating film forming step provides, on the base body, a metal layer having a thickness of 30 nm or greater and which layer is comprised of a group of island shaped metal particles separated from each other, and the resultant metal layer has a surface resistance value of at least $1\times10^6$ (Ω/square).

With the coating film forming method having the above-described arrangement, while the sufficient mirror-face distinguished aesthetic property is retained, the surface resistance can be sufficient high as high as at least $1\times10^6$ (Ω/square). Hence, even in its application to the outer surface of a door handle of a smart entry type door opening/closing apparatus, capacitance coupling between the sensor and the metal layer will hardly occurs. As a result, there can be obtained a door opening/closing apparatus in which the change of electrostatic capacitance occurring in the vicinity of the sensor is stable, thus effectively restricting occurrence of an operation error or an operation failure. Further, since the metal layer provided in the door handle is comprised of a group of island shaped metal particles separated from each other, even in the event of occurrence, during use, of partial corrosion due to e.g. formation of a surface flaw as deep as reaching the metal layer, the inter-particle gaps between the metal particles effectively prevent the corrosion from reaching the adjacent metal particles, advantageously.

BRIEF DESCRIPTION OF THE DRAWINGS

FIG. 5 is a schematic showing a microstructure of a metal layer relating to the present invention, FIG. 6 is a schematic showing a microstructure of a metal layer of a comparison example, FIG. 7 shows listings of properties of comparison examples, FIG. 8 are SEM photos showing microstructures of Example 1 and Comparison Examples, FIG. 9 is a schematic showing a microstructure of a metal layer of Example 2, FIG. 10 is an SEM photo showing the microstructure of the metal layer of Example 2, and FIG. 11 shows listings of properties of Example 2 and Comparison Example in comparison with each other.

MODES OF EMBODYING THE INVENTION

Modes of embodying the present invention will be described next with reference to the accompanying drawings.

Figure 1:
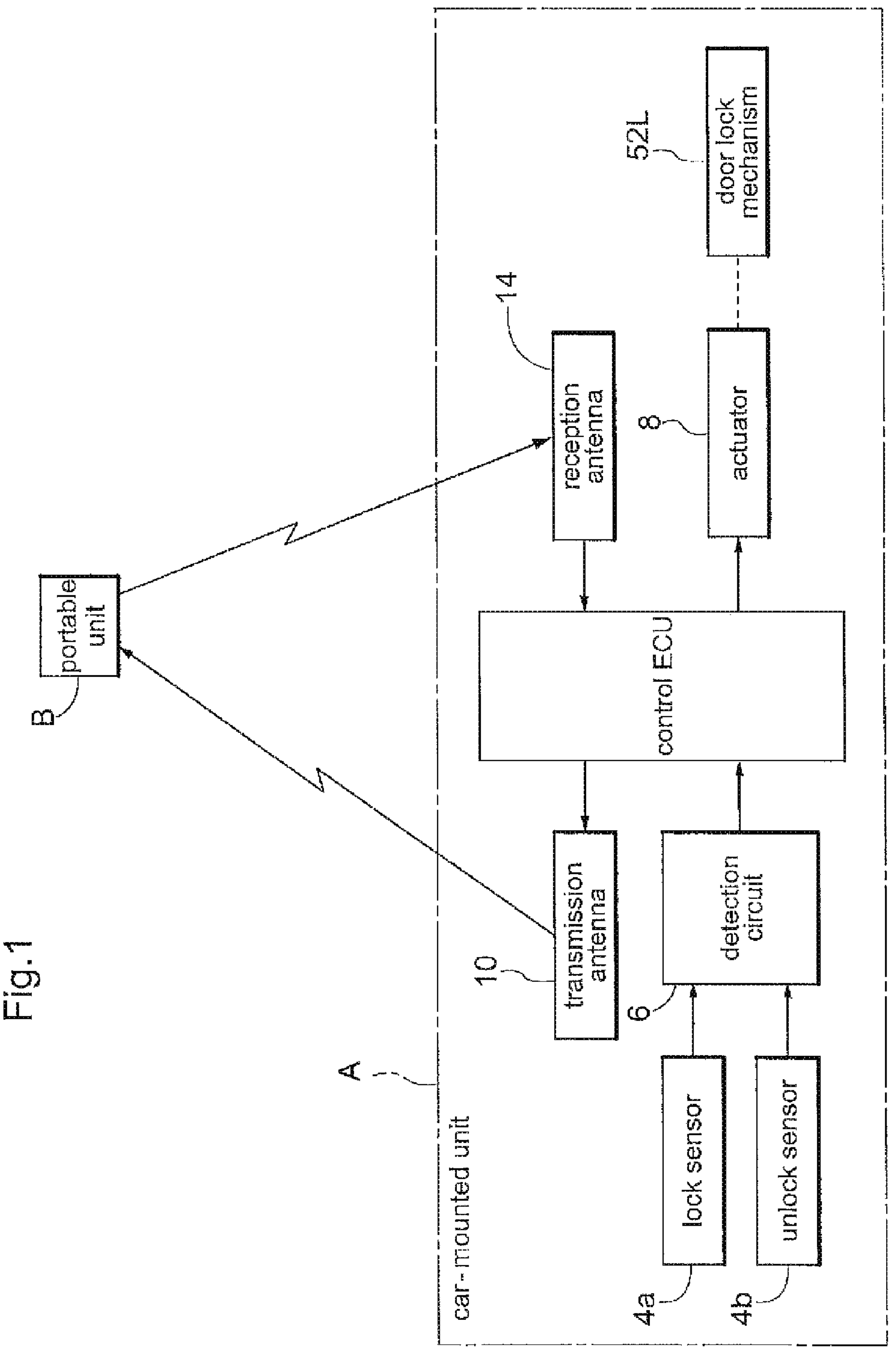
FIG. 1 is a block diagram showing a schematic construction of a door opening/closing apparatus relating to the present invention.

As shown in FIG. 1, a smart entry type door opening/closing apparatus relating to the present invention is comprised of a car-mounted unit A mounted on a vehicle (car) and a portable unit B carried by a user of the vehicle in his/her pocket or the like.

Figure 2:
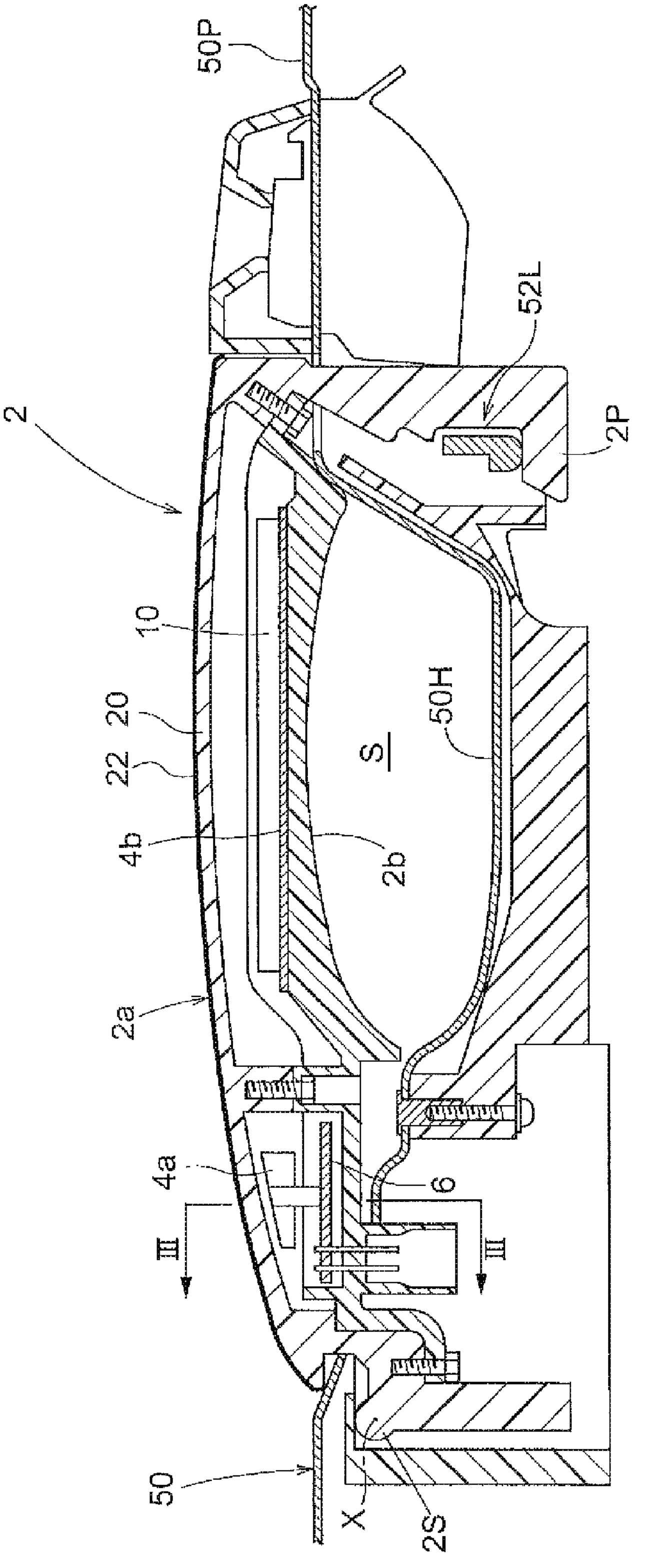
FIG. 2 is a broken plan view showing principal components of a car-mounted unit of the door opening/closing apparatus.
Figure 3:
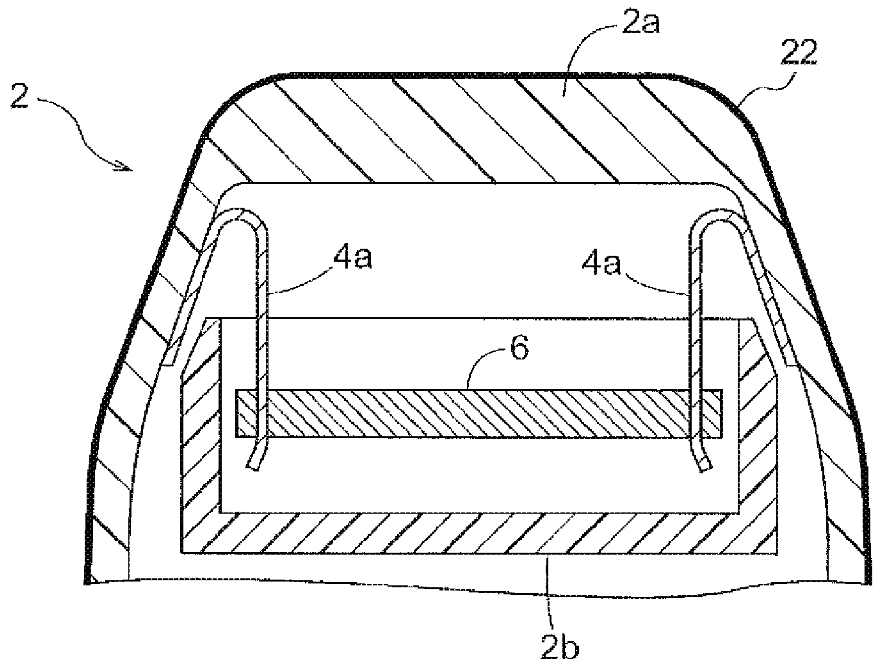
FIG. 3 is a broken side view showing a section along III-III in FIG. 2.

As shown in FIG. 2 and FIG. 3, the car-mounted unit A include a door opening/closing handle 2 attached to a vehicle door 50 to be pivotable about an axis X, an electrode type lock sensor 4*a* and an unlock sensor 4*b* provided in the door handle 2 and a detection circuit 6 configured to detect a change of electrostatic capacitance which occurs in the vicinity of the respective sensors 4*a*, 4*b* in response to approach or contact of a user's hand (an example of "a human body portion") to respective portions of the door handle 2 and then to output an operation signal for locking (or unlocking).

Further, as shown in FIG. 1, the car-mounted unit A includes also an actuator 8 for operating (for locking or unlocking) a locking mechanism 52L of a door 50 based on the operation signal outputted from the detection circuit 6, and a transmission antenna 10 and a reception antenna 14 which effect transmission/reception with the portable unit B.

In this embodiment, the transmission antenna 10 is disposed inside the door handle 2, whereas the reception antenna 14 is disposed inside e.g. a pillar or a luggage room. The car-mounted unit A further includes a transmission circuit (not shown) for the transmission antenna 10, a reception circuit (not shown) for the reception antenna 14, a lock/unlock signal circuit (not shown) for the lock sensor 4*a* and the unlock sensor 4*b*, and a control ECU connected to a drive circuit for the actuator 8, etc. The portable unit B includes a transmission antenna, a reception antenna and an ECU (not shown).

As shown in FIG. 1, from the transmission antenna 10 of the car-mounted unit A, there is constantly transmitted a request signal of a frequency of e.g. 134 kHz. When the portable unit B receives this request signal, the unit B returns a signal of a frequency of 300 MHz with a modulated transponder ID code. This 300 MHz frequency signal received by the reception antenna 14 is demodulated in a reception section and then inputted to the control ECU. Then, the control ECU receives the transponder ID code and collates this with an ID code stored in a memory (not shown). Then, if these ID codes are found to mach each other, if the unlock sensor 4*b* is touched, the vehicle will be unlocked or if the lock sensor 4*a* is touched, the vehicle will be locked. And, based on an unlock signal or a lock signal, the control ECU will render the actuator 8 into a locking state or an unlocking state.

(Construction of Door Handle)

As shown in FIG. 2, the door handle 2 includes an outer member 2*a* facing to the outer side of the vehicle and an inner member 2*b* attached to the inner side of the outer member 2*a*. At the one end of the outer member 2*a*, there is formed a shaft member 2S for supporting the handle door 2 to the door 50 with the handle 2 being pivotable about the axis X and at the other end of the same, there is provided a retention-target piece 2P engageable with a lock mechanism 52L. In a space formed between the outer member 2*a* and the inner member 2*b*, there are disposed the lock sensor 4*a*, the unlock sensor 4*b*, the transmission antenna 10, a base body of the detection circuit 6, etc. And, these components are fixed to the inner member 2*b*. Both the outer member 2*a* and the inner member 2*b* are formed of a resin (an example of insulator) and are fixed to each other by means of screws at the front and rear opposed end portions thereof. between a dent 50H of a door panel 50P and the inner member 2*b*, there is formed a space S into which the user can insert his/her hand.

The outer member 2*a* of the door handle 2 includes a base body 20 formed of PBT (polyethylene terephthalate) by the injection molding technique. On a face of this base body which corresponds to the outer side of the vehicle, there is formed a metal layer 22 for providing an aesthetically distinguished mirror-face like appearance.

Figure 4:
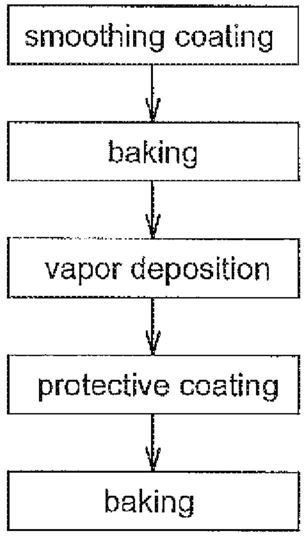
FIG. 4 is an explanatory view showing a coating process of a door handle.

More particularly, on the face of the outer member 2*a* corresponding to the outer side of the vehicle, there is provided a three-layered coating film. As shown in FIG. 4 and FIG. 5, the first layer is a layer having a thickness of about 20 μm formed as a "smoothing coating" for smoothing the surface of the base body 20, This first layer is formed by applying an amount of acrylic urethane based coating material on the surface of the base body 20 made of PBT and subsequent "baking" thereof by heat-drying. The metal layer 22 as the second layer, is a layer for adding the mirror-face like appearance to the door handle 2 and this is a tin coating film having a thickness of about 50 nm provided on the foundation layer by the "vacuum deposition" technique (an example of "thin film coating technique"). The third layer is a layer having a thickness of about 30 μm, formed as a "protective coating" for protecting the metal layer 22. This layer is formed by applying an amount of acrylic urethane based coating material on the surface of the metal layer 22 and curing it by heat drying. Incidentally, the thickness of the metal layer 22 is not limited to about 50 nm. The thickness can range suitably from 10 to 200 nm.

(Structure of Metal Layer)

As shown in FIG. 5, the metal layer 22 is comprised not of a continuous single metal thin film, but of a group of tin particles deposited on the surface of the first layer by the vacuum deposition technique. Each individual particle has a platy shape extending along the surface of the foundation layer and has a particle size ranging from 10 nm to 2 μm and a thickness ranging from about 30 to 50 nm. The group of the thin particles as a whole exhibit an island shaped configuration with the respective particles being separated from each other with an inter-width gap ranging from 5 to 200 nm therebetween. The metal layer 22 as a whole has a sufficient index of reflection (40 to 60%).

On the other hand, in spite of such sufficient reflection index as above, this metal layer 22 has a high surface resistance value (as measured prior to the formation of the protective layer) as high as $1\times10^{12}$~$3\times10^{12}$ (Ω/square). As a result, there is obtained a door opening/closing door handle 2 that has a distinguished aesthetic property as good as that of the standard chrome plating and whose metal layer 22 hardly provides any adverse effect to the functions of the lock sensor 4*a*, the unlock sensor 4*b*, the transmission antenna 10, etc. relating to the electromagnetic wave, the electrostatic capacitance thereof, etc. In particular, the above arrangement effectively restricts a phenomenon of unwanted capacitance coupling between the lock sensor 4*a* or the unlock sensor 4*b* and the metal layer 22. Hence, there is obtained a door handle 2 which hardly causes an operation error or an operation failure in the locking or unlocking operation attempted by the user who causes his/her hand to approach or contact to the door handle 2.

The reason for the high surface resistance value of the metal layer 22 is that this metal layer 22 as a whole is comprised not of a continuous coating film, but of a group of island shaped tin particles independent of and separated from each other as illustrated in FIG. 5.

(Coating Film Forming Conditions of Metal Layer)

The metal layer 22 is formed by the vacuum deposition technique as an example of the art of thin film coating. More particularly, the layer is formed under the following film forming conditions presented as a non-limiting example.

vacuum degree: $2\times10^{-2}$ Pa or lower electric current value: 120 mA film forming rate: 0.9~1.2 nm/sec evaporation source-base body distance: 500~800 mm (the base body is disposed immediate above the evaporation source, with the deposition-target face thereof oriented downwards)

Under the above-described film forming conditions, on the base body, there was formed an appropriate metal layer having a thickness ranging from 30 to 50 nm by a continuous film forming process for from about 30 to 60 seconds. Incidentally, if the film forming period is too long, the respective tin particles will be extended in a convex manner, thus impairing the flatness, so that there tends to occur such problem as the light reflection index becoming insufficient.

As the metal element or alloy used for obtaining the metal layer 22 by the vacuum deposition technique, one having a lower melting point than aluminum is suitable. Tin which has been confirmed as one example of optimum metal in this invention has a melting point of 232□. If the vapor deposition is effected with using aluminum (melting point: 660□) as the evaporation source, the resultant layer will not be formed as a group of islets-lie particles and high surface resistance value will not be obtained. This applies also chrome (melting point: 1890□).

As examples of such metal elements or alloys having lower melting points than aluminum, there can be cited magnesium (melting point: 651□), indium (melting point: about 157□), tin/bismuth alloy, etc. And, in the case of using one of these as the evaporation source too, there can be obtained a group of island shaped particles and sufficient high surface resistance values.

EXAMPLE 1

FIG. 7 shows a listing of properties of Example 1 of the metal layer 22 formed on the "smoothing coating" under the above-described film forming conditions in comparison with those of comparison examples. The comparison examples adopted the same vacuum degree and current value as those of Example 1, but the metal layers thereof were formed by vapor deposition using aluminum as the evaporation source.

FIG. 8 show SEM photos showing microstructures of the metal layer 22 of Example 1 and Comparison Examples, in which for Example 1 alone, an SEM photo of the section is shown in addition to the plan view SEM photo (upper one) of the surface of the metal layer 22.

From the photos of FIG. 8, it can be clearly seen that the metal layer 22 of Example 1 is comprised of a group of mutually independent island shaped tin particles and these tin particles have fairly uniform outer diameters ranging from 100 to 300 nm. Also, from the listing of FIG. 7, it may be understood that the metal layer 22 of Example 1 has a sufficiently high surface resistance value exceeding $2\times10^{12}$ (Ω/square) thus not providing any effect to the functions of the antennas and sensors.

Incidentally, the SEM photo on the lower side of FIG. 8 represents observation of cut cross section of the metal layer 22, not representing a portion of the SEM photo on the upper side. However, this was obtained from the same sample as that of the upper side SEM photo. From this photo of the cut section, it may be seen that the respective metal particles in the form of islets are separated from each other and extend along the surface of the base body 20.

From FIG. 7 and FIG. 8, the following respects can be understood. Namely, in the case of the metal layers of the comparison examples, in both cases of the film thickness of 10 nm and 50 nm, the metal layers were not comprised of independent island shaped metal particles, but of continuous single metal layers (SEM photos) having very small surface resistance values ranging from 2.7 to 30.5 (Ω/square), so that while these did not provide adverse effect to the function of the antenna, but did provide adverse effect to the function of the sensor.

Incidentally, the respective surface resistance values described above were determined from the metal layers prior to addition of the protective layer (second layer) thereto, by the measurement method according to JIS-K6911 with using a double-ring electrode type resistance meter (Mitsubishi Chemical Analytech Co., Ltd.: Hiresta-UP MCP-HT450).

EXAMPLE 2

Example 2 will be described with reference to FIGS. 9 through 11. Example 2 differs from Example 1 in that the metal layer 22 was formed of indium and an inorganic transparent thin film made from $SiO_2$ (silicon dioxide) was provided between the metal layer 22 and the protective coating Because the inorganic transparent thin film too can be formed by the vacuum deposition after the formation of the metal layer 22 by the vacuum deposition, the process can proceed in a continuous manner, thus contributing to improvement of productivity. With the provision of the inorganic transparent thin film, even in the event of degradation of the protective coating due to e.g. UV exposure, development of corrosion or discoloration of the metal layer 22 can be effectively restricted by the inorganic transparent thin film which is chemically stable.

In FIG. 9, the film thickness of the inorganic protecting thin film is shown as 30 nm. However, the film thickness is not limited thereto, but can range from 5 to 300 nm approximately. Further, the material forming the inorganic transparent thin film is not limited to $SiO_2$, but can instead be a transparent oxide such as $TiO_2$ (titanium oxide), $ZrO_2$ (zirconia), $Ta_2O_5$ (tantalum pentoxide), $Nb_2O_5$ (niobium pentoxide), $Al_2O_3$ (alumina) or a transparent nitride such as AlN (aluminum nitride), GaN (gallium nitride) or any other transparent compound such as MgF (magnesium fluoride).

FIG. 10 shows an SEM photo of the metal layer 22 of Example 1. From this photo, it can be seen that the respective metal particles forming islets having greater particle diameters than those of Example 1 are separated from each other. Further, FIG. 11 shows results of accelerated weathering test and adherence test conducted on Example 2 and Comparison Example 3 which is same as Example 2 except for absence of the inorganic transparent thin film formation. In the accelerated weathering test, after SWOM800 hrs, cold cycle was effected for 5 cycles (cold cycle: −20□×22 hr; room temperature×1 hr; 60□ water submersion×22 hr; room temperature×1 hr, 80 □×1 hr, room temperature×1 hr), and we could confirm that in Example 2 color difference change due to corrosion of the metal layer 22 was restricted. In the adherence test, a tape peeling test under 1 mm×100 mass was effected. In this, in Example 2, the number of peelings was 0/100 which satisfied the acceptance criterion, hence, it was confirmed that the provision of the inorganic transparent film did not result in any reduction in the initial adherence.

OTHER EMBODIMENTS

<1> As the method of forming the metal layer 22 and the inorganic transparent thin film, it is possible to employ any other vapor deposition method than the vacuum deposition method, that is, ion sputtering, ion plating, or any other thin film forming method e.g. CVD.

<2> The material forming the base body 20 is not limited to PBT. Instead, various resins such as PC (polycarbonate) can also be employed.

<3> The first layer and the third layer of the coating film provided on the base body 20 can range from 10 to 40 μm. And, their materials are not limited to the acrylic urethane based coating material, but can be various kinds of coating material such as acrylic coating material, UV curing coating material, etc.

INDUSTRIAL APPLICABILITY

The invention can be applied to a smart entry type door opening/closing apparatus for a vehicle with a door handle having an excellent metallic luster, yet hardly suffering an operation error or an operation failure at the time of locking/unlocking operation.

DESCRIPTION OF REFERENCE MARKS

A car-mounted unit
B portable unit
2 door handle
2*a* outer member
2*b* inner member
4*a* lock sensor (electrode)
4*b* unlock sensor (electrode)
6 detection circuit
8 actuator
10 transmission antenna
14 reception antenna
20 base body
22 metal layer
50 door
52L lock mechanism

The invention claimed is:

1. A door opening/closing apparatus comprising:

a door opening/closing handle provided in a door of a vehicle;

a sensor provided in the door handle;

a detection circuit configured to detect a change in electrostatic capacitance occurring in the vicinity of the sensor in response to approaching or contacting of a human body portion relative to the door handle and to output a locking or unlocking operation signal;

a device for executing locking/unlocking of the door based on the operation signal; and a transmission/reception antenna for effecting transmission/reception with a portable unit corresponding to the vehicle;

wherein the door handle includes an insulating base body, and on a vehicle outer side surface of the base body, there is attached a metal layer comprised of a group of island shaped metal particles that extend along the surface of the base body and that are separated from each other.

2. The door opening/closing apparatus according to claim 1, wherein the metal particle has a thickness ranging from 10 to 200 nm and a surface resistance value of at least $1\times10^6$ (Ω/square).

3. The door opening/closing apparatus according to claim 1, wherein the metal layer is formed by vacuum deposition and the metal particles are comprised of a metal element or an alloy having a lower melting point than aluminum.

4. The door opening/closing apparatus according to claim 1, wherein the inter-particle gaps between the metal particles adjacent each other range from 5 to 200 nm.

5. The door opening/closing apparatus according to claim 1, wherein the metal particles have a particle diameter ranging from 10 nm to 2 μm.

6. The door opening/closing apparatus according to claim 1, wherein the metal particles are formed of tin.

7. The door opening/closing apparatus according to claim 1, wherein the metal particles are formed of indium.

8. The door opening/closing apparatus according to claim 1, wherein an inorganic transparent thin film is formed between the metal layer and a protective coating for protecting the metal layer.

9. A coating film forming method comprising a coating film forming step for forming a metal layer by vapor deposition on a base body formed of an insulator;

wherein the metal layer is comprised of a metal element or an alloy having a lower melting point than aluminum; and the coating film forming step provides, on the base body, a metal layer having a thickness of 30 nm or greater and which layer is comprised of a group of island shaped metal particles separated from each other, and the resultant metal layer has a surface resistance value of at least $1\times10^6$(Ω/square).

10. The coating film forming method according to claim 9, wherein after an inorganic transparent thin film is formed on the surface of the metal layer, a protective coating is formed on the surface of the inorganic transparent thin film.

* * * * *